May 19, 1970      R. F. ARNOLDY      3,513,287
WELDING APPARATUS AND METHOD UTILIZING
COMPRESSIBLE ELASTIC ELECTRODE
Filed April 8, 1969      2 Sheets-Sheet 2
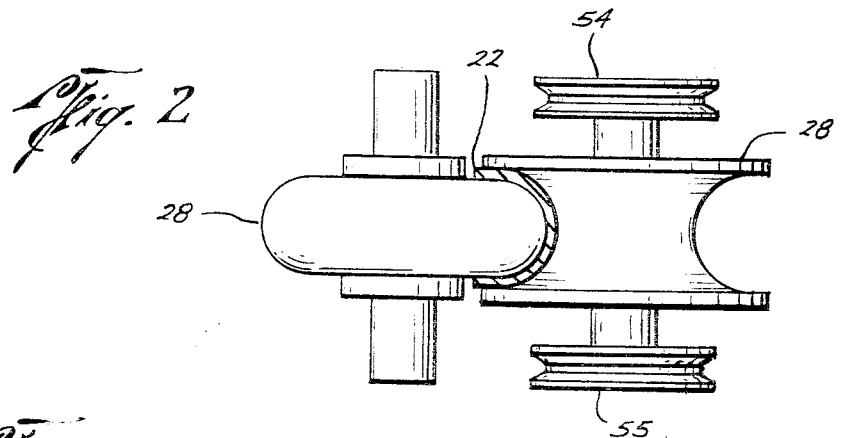
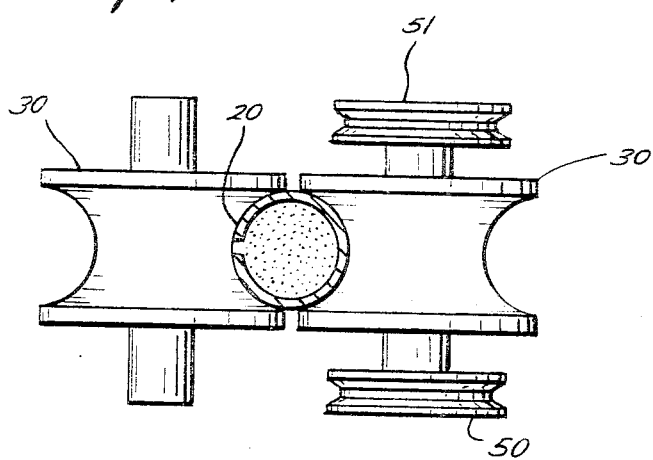
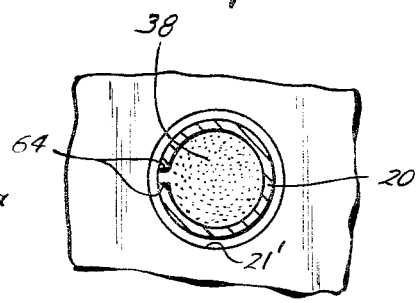
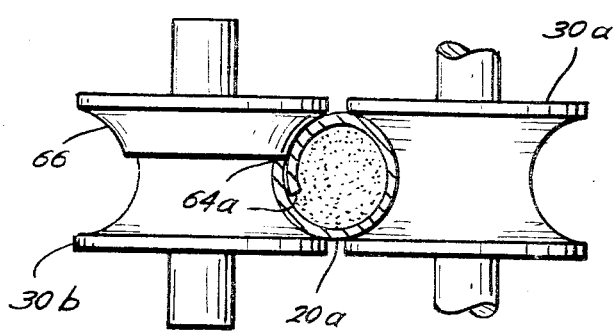
Roman F. Arnoldy
INVENTOR.
BY James H. Weiler,
Jefferson D. Giller
Dudley R. Dobie, Jr.
ATTORNEYS

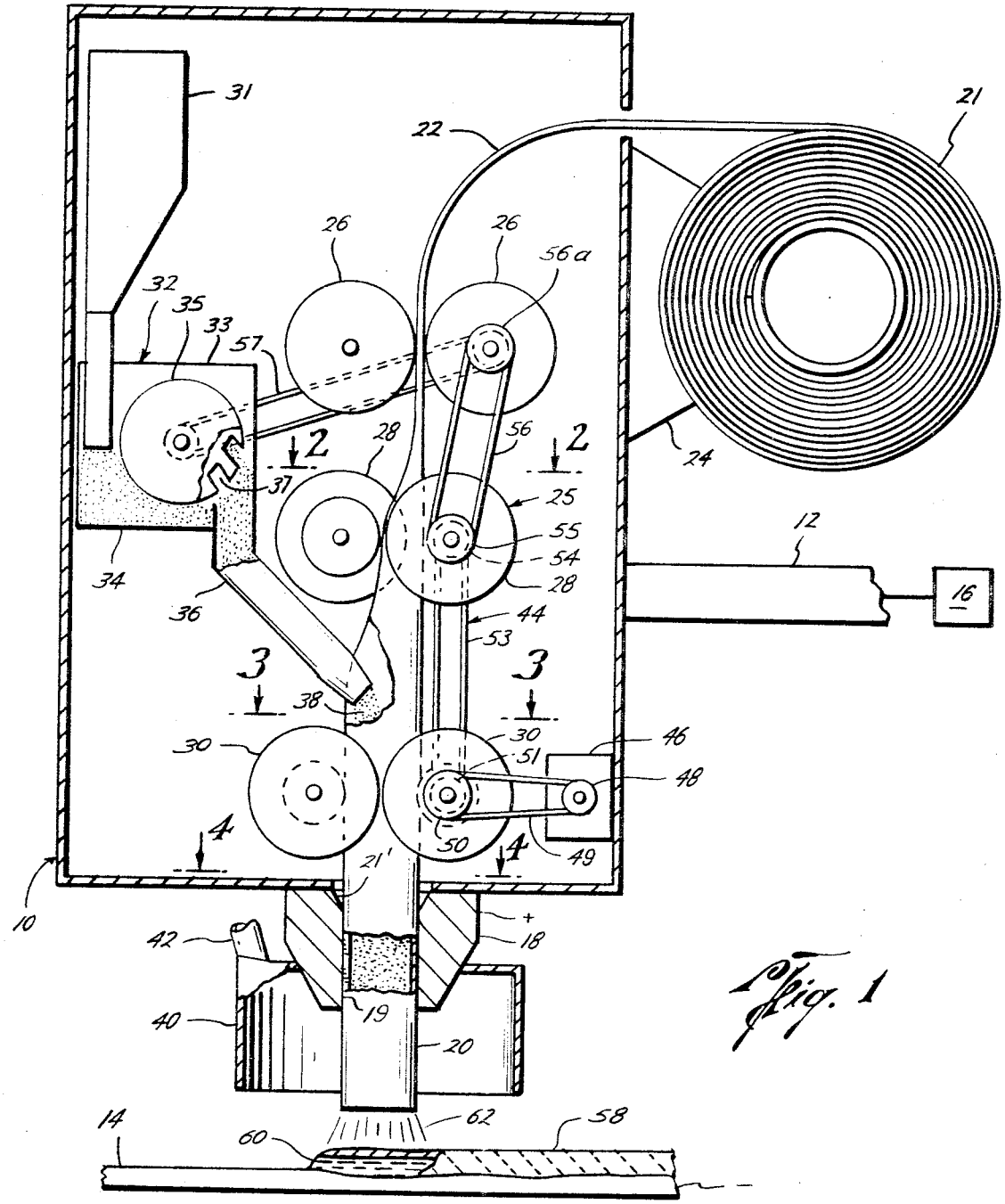

United States Patent Office 3,513,287
Patented May 19, 1970

3,513,287
WELDING APPARATUS AND METHOD UTILIZING COMPRESSIBLE ELASTIC ELECTRODE
Roman F. Arnoldy, Houston, Tex., assignor to R. I. Patents, Inc., Houston, Tex., a corporation of Texas
Continuation-in-part of application Ser. No. 528,126, Feb. 17, 1966. This application Apr. 8, 1969, Ser. No. 814,327
Int. Cl. B23k 9/00
U.S. Cl. 219—137                                4 Claims

ABSTRACT OF THE DISCLOSURE

A method of welding in which a compressible elastic tubular electrode is passed through a passageway in an electrode nozzle which passageway has a lesser cross-sectional dimension than that of the tubular electrode prior to entry of the electrode into the passageway whereby the tubular electrode is compressed and makes electrical contact with a wall of the passageway. A welding apparatus including a welding head suspended over a surface to be welded and carrying a compressible elastic tubular electrode, an electrode nozzle having a passageway therethrough of lesser cross-sectional dimension than that of the tubular electrode prior to its entry into the passageway, and means to move the tubular electrode through the passageway.

CROSS-REFERENCE TO RELATED APPLICATION

This is a continuation-in-part of application Ser. No. 528,126 filed Feb. 17, 1966 for an invention in "Annular Arc Welding" which application No. 528,126 is being abandoned contemporaneously with the filing of the present application.

BACKGROUND OF THE INVENTION

The field of art to which the invention pertains is electric arc welding using a welding head and more particularly to such electric welding in which the weld bead includes metal from a consumable tubular electrode. It is conventional in such welding to pass the electrode, whether it be either a solid wire or tubular material, through an electrode nozzle located near the surface being welded. This electrode nozzle and the surface being welded are electrically charged. To establish an arc between the electrode and the surface being welded, the electrode nozzle makes electrical contact with the electrode. With electrodes and nozzles commonly in use, there is difficulty in establishing uniform electrical connection between the electrode and the nozzle and as a result excessive damage to the nozzle is often created. In the present invention, a uniform electrical contact is maintained without excessive wear on the nozzle by the use of a compressible elastic tubular electrode passing through a passageway in an electrode nozzle which passageway has a lesser cross-sectional dimension than that of the tubular electrode prior to its entry into the passageway.

"Welding" as used herein includes securing pieces of base metal together, cladding and the like.

The prior art includes passing an electrode wire or a tubular electrode through an electrode nozzle in which the passageway through the nozzle has a larger cross-sectional dimension than the electrode. Contact is maintained by bending the electrode at the point of entry into the nozzle and/or at the point of exit. This provides a minimum electrical contact between the electrode and the electrode nozzle resulting in such concentrations of electrical power at these points of contact that the electrode nozzle is often sufficiently heated to melt portions of it resulting in damage to the electrode nozzle. In an attempt to overcome such problems, electrode nozzles have sometimes been made in the form of two spring-loaded shoes which bear against the electrode. Even with such spring-loaded shoes, it is still difficult to maintain uniform electrical contact between the shoes and the electrode and, additionally, the force bearing against the electrode is determined by the spring-loading rather than by the characteristics of the electrode itself.

U.S. Pat. No. 1,356,468 entitled "Electrode" and issued Oct. 19, 1920 illustrates what appears to be a compressible elastic tubular electrode but there is no suggestion in that patent as to how electrical contact is made with it.

U.S. Pat. No. 3,184,578 entitled "Metal Transferring Process and Apparatus" issued May 18, 1965 illustrates a tubular electrode which does not appear to be compressible and the manner of making electrical contact with it is not clearly disclosed.

SUMMARY OF THE INVENTION

It is a general object of the present invention to provide an apparatus and a method for electric arc welding in which uniform electrical contact is maintained between a compressible elastic tubular electrode and an electrode nozzle through which such electrode passes.

Another object of the present invention is to provide such a method and apparatus which minimizes damage to the electrode nozzle.

Another object of the present invention is to provide such a method and apparatus for electric welding in which a compressible elastic tubular electrode is passed through a passageway of an electrode nozzle which passageway has a lesser cross-sectional dimension than that of the tubular electrode prior to its entry into the passageway whereby the electrode is compressed and its elasticity causes it to make firm electrical contact with the wall of the passageway through the nozzle.

The method of this invention generally comprises the last stated object.

The term "compressible" as used herein with respect to the tubular electrode of the present invention is meant an electrode which, during welding operations, can be compressed to a smaller cross-sectional dimension by passing it through a passageway in a nozzle which has a lesser cross-sectional dimension than that of the electrode prior to its entry into the passageway. Preferably a tubular compressible electrode is not completely closed and has spaced edges which permit it to be compressed. A compressible tubular electrode may also be provided by having the edges of the electrode lapped.

The term "elastic" as used herein with respect to the tubular electrode of this invention is meant an electrode, the wall of which is formed of material which urges the wall of the electrode outwardly against the wall of the passageway through the electrode nozzle when the tubular electrode is compressed in the passageway of that nozzle. Many tubular electrodes have walls of iron and/or steel and such material is elastic.

With the apparatus and method of the present invention, there is excellent electrical contact between the electrode nozzle and the electrode along the entire length of the passagway that has reduced the cross-sectional dimension of the electrode. Additionally the amount of pressure on the electrode within the nozzle is determined by the elasticity of the electrode itself and not by some external force and as a result there is less danger of misshaping or damaging the electrode.

BRIEF DESCRIPTION OF THE DRAWINGS

FIG. 1 is a partial sectional side view of an apparatus suitable for use with the invention, FIG. 2 is a view taken along the line 2—2 of FIG. 1, FIG. 3, is a view taken along the line 3—3 of FIG. 1, FIG. 4 is a view of a tubular electrode taken along the line 4—4 of FIG. 1, and FIG. 5 is a modified form of the structure of FIG. 3.

Referring now to the drawings, the reference numeral 10 generally designates the welding head which is supported, such as by the boom 12, above the metal surface 14 which is to be welded. Attached to the boom 12 is an appropriate means 16 for moving the welding head 10 relative to the surface 14, either in a straight line pattern, zigzag pattern, and with or without oscillation as desired.

Extending downwardly from the welding head 10 is an electrode nozzle 18 having a passageway 19 through which a compressible elastic tubular electrode 20 is pushed, and which serves as a means for establishing electrical contact with the electrode 20. Also mounted on the welding head 10 is a supply, in the form of a coil 21, of elastic metal strip material 22 which coil is rotatably supported by the coil support 24. The strip material 22 is fed from the coil 21 through a pair of guide rollers 26 to a forming means 25 which includes a pair of initial forming rollers 28 and a pair of completion rollers 30 so that the tubular electrode 20 is formed from the strip material 22.

Mounted within the welding head 10 is the granular alloy feeding means 32 which may generally include a metering means 34 and a granular insertion means 36 whereby granular alloy material 38 is metered and fed into the tubular electrode 20 between the initial forming rollers 28 and the completion rollers 30. The granular material 38 falls through the tubular electrode 20 to the surface 14 to be welded.

Preferably the granular alloy feeding means 32 includes a hopper 31 into which the granular material 38 is placed. The hopper 31 feeds into a bin 33 in which rotates a feed or metering wheel 35 having a plurality of recesses or pockets 37 which pick up the granular material from the bin 33 at a measured rate and deposit it into the granular insertion means 36. Similar apparatus is disclosed in my Pats. Nos. 3,060,307 and 3,172,991 to which reference is made.

Appropriately attached to the welding head 10 at the nozzle 18 and surrounding the electrode 20 is an optional shield 40 which may be utilized to provide a gas shield to the electrode 20 by means of an appropriate gas inlet 42 leading thereto. Similarly, the shield 40 may be used for surrounding the electrode 20 with flux or to provide a submerged arc, if desirable. A further explanation of gas shielding may be found in such U.S. patents as No. 3,102,025 and No. 2,725,125. Additionally, flux may be metered and supplied with the granular materials if desired.

Interconnecting the forming rollers 28 and the completion rollers 30 is a drive means or mechanism 44. It also interconnects with the metering means 34. This drive means 44 is utilized to pull the metal strip 22 from the coil 21, move the strip 22 through the rollers 28 and 30 to form the electrode 20 and pass it downwardly through the nozzle 18 at the desired speed while coordinating the rate of feed of granular alloy material 38 into the electrode 20 by controlling the rotation of the feed wheel 35. This drive mechanism 44 includes a motor 46 driving a pulley 48 to move a belt 49 which is mounted on a pulley 50 on one of the completion rollers 30 to rotate that completion roller. That completion roller also has a pulley 51 on which is a belt 53 which passes over a pulley 54 on one of the forming rollers 28 to impart rotation to it. On that same forming roller 28 is another pulley 55 on which is a belt 56 which connects to a pulley 56a on one of the guide roller 26. A belt 57 is connected between pulleys, not shown, on this guide roller 26 and the feed wheel 35.

Referring to FIG. 4, the tubular electrode 20 is shown as cylindrical and, of course, may be elliptical, oval or any other generally tubular shape as may be desired. In the form of tubular electrode 20 as shown in FIG. 4, the electrode 20 is not completely closed and instead has spaced edges 64. The passageway 19 through the electrode nozzle 18 has a slightly lesser internal cross-sectional dimension than the external cross-sectional dimension of the tubular electrode 20 immediately above the electrode nozzle 18. For ease of entry of the tubular electrode 20 into the passageway 19, there is provided at the upper end of the passageway 19 an upwardly and outwardly extending beveled surface 21'.

When the tubular electrode 20 passes through the passageway 19 of the electrode nozzle 18, it can be and is compressed to the same cross-sectional dimension as that of the passageway 19 because of the spaced edges 64 and the lesser cross-sectional dimension of the passageway 19 than of the electrode 20 immediately above that passageway 19. Due to the elasticity of the strip metal 22 from which the tubular electrode is made, the tubular electrode 20 makes sliding contact along the length of the wall of the passageway.

The electrode nozzle 18 is shown at a positive potential and the surface 14 as negative, being supplied by conventional equipment of approximately 500 ampere capacity. Both positive and reverse polarity direct current, as well as AC, may be utilized with the present invention. The sliding contact of the tubular electrode 20 along the length of the wall of the passageway 19 causes excellent electrical contact between that wall and the electrode.

Shown in FIG. 4 within the electrode 20 is the granular alloy material 38 which is falling to the surface 14 (see FIG. 1) to which it will become attached and form a bead 58. Since the granular alloy material 38 is not packed and held within the tubular electrode 20, it will not prevent the compression of the electrode 20 when that electrode is inserted into the passageway 19.

As best seen in FIG. 1, the granular alloy material 38 falls into a molten puddle 60 formed by the arc 62 at the rim of the lower end of the electrode 20 and is deposited in the puddle 60 within the confines of the arc 62. As the granular alloy material 38 falls into the puddle 60 on the metal surface 14, the granular alloy material 38 takes the polarity of the surface 14. The heat of the upper end of the arc 62 melts the electrode 20 but the granular material 38 flowing through the electrode 20 and deposited in the puddle 60 on the surface 14 is melted principally by the lower end of the arc 62 and by the heat of the puddle 60 together with heat from the plasma of the arc 62.

Preferably the tubular electrode 20 is about 1 inch in diameter, has a wall thickness of about 0.005 inches and the gap between the spaced edges 64 is ⅛ to ¼ of an inch wide after leaving the completion rollers 30 and prior to entry into the passageway 19. With this tubular electrode and gap between the spaced edges 64, it is preferred that the diameter of the passageway 19 is such that the tubular electrode 20 is compressed so that the gap between the spaced edges 64 is reduced to approximately 1/64 to 1/16 of an inch. Of course, the dimensions of the passageway 19 must be such that the gap between the spaced edges 64 of the tubular electrode 20 is not completely closed, otherwise there will be deformation of the tubular electrode 20.

Referring to FIG. 5, there is shown a modification of the completion rollers 30 of FIG. 3. In FIG. 5, one of the completion rollers 30a is the same as either of the completion rollers 30 shown in FIG. 3. However, the other completion roller 30b, instead of having a symmetrical concave surface to complete the tubular electrode 20 has a stepped surface 66 which completes a tubular electrode 20a with lapped edges 64a rather than the spaced edges 64 in the construction shown in FIGS. 3 and 4. Passage of this form of tubular electrode 20a through the passageway 19 will also cause it to compress.

In use, the welding head 10 is positioned over the metal surface 14. The means 16 is actuated to move the welding head 10 relative to the metal surface 14 and at the same time the drive mechanism 44 is engaged so that the strip material 22 is fed through the tube forming means 25 to form the tubular electrode 20 which is pushed toward the surface 14 through the electrode nozzle 18. When the proper distance is reached, an arc is struck between the electrode 20 and the surface 14 which, of course, melts off the lowermost portion of electrode 20. At the same time, granular alloy material 38 is placed in hopper 31 in order to meter and insert granular alloy material 38 into the electrode 20 whereupon this material 38 will fall upon the molten puddle 60 on the surface 14. The lower end of the annular arc and the heat of the puddle will melt this granular material thus forming the bead 58 as the welding head 10 is moved.

An example of the use of the method and apparatus of the present invention is to do a hard-facing type of cladding to produce a high chromium iron hard-facing on the surface 14. The alloy material 38 is a powder having (i) 90% high carbon ferrochromium, consisting of 65% chromium, 9% carbon and the balance iron and (ii) 10% ferromanganese consisting of 75% manganese, 7½% carbon and the balance iron. The strip material 22 is 0.005 inch thick, 2.9 inches fide and made of mild steel having approximately .10% carbon with the balance being principally iron. This strip is formed into an electrode 20 having a 1 inch diameter with a nearly ¼ inch gap between the spaced edges 64. The diameter of the passageway 19 is 0.97 inch. A 450 ampere current is used to melt the electrode 20 at the rate of .2 pound of electrode per minute. The ratio of alloy material 38 melted to weight of electrode 20 melted is 1.5 so the alloy material 38 would be fed at the rate of .3 pound per minute. The travel rate of the welding head 10 is adjusted to produce a high chromium iron hard-facing of approximately 5/32 of an inch in thickness.

While the present invention may be used with an open arc because the granular alloy material 38 is surrounded by an arc from the tubular electrode 20 which restricts the material 38 from being blown away, it may at times be advantageous to shield, flux or submerge the arc between the electrode 20 and the surface 14. This may be accomplished by the shield 40 or by feeding appropriate materials into the tubular electrode 20 as it is formed.

The present invention, therefore, is well adapted to carry out the objects and attain the ends and advantages mentioned as well as others inherent therein. While the presently preferred embodiment of the invention has been given for the purpose of disclosure, numerous changes in details of construction and uses may be resorted to without departing from the spirit and scope of the invention as defined in the following claims.

What is claimed is:

1. In a method of welding in which a compressible elastic tubular electrode having edges selected from the group consisting of spaced and lapped is electrically contacted by an electrode nozzle carried by a welding head, the improvement comprising passing such tubular electrode through a passageway in an electrode nozzle which passageway has a lesser cross-sectional dimension than that of the tubular electrode prior to entry of the tubular electrode into the passageway whereby the tubular electrode is compressed by the passageway and makes electrical contact with a wall of the passageway.

2. In a welding head which has relative parallel movement to a metal surface to be welded, the improvement comprising:
    (a) a compressible elastic tubular electrode,
    (b) an electrode nozzle,
    (c) a passageway through the electrode nozzle, the passageway having a lesser cross-sectional dimension than that of the tubular electrode prior to entry of the tubular electrode into the passageway, and
    (d) means to move the tubular electrode through the passageway whereby the tubular electrode is compressed by the passageway and its elasticity causes electrical contact of the tubular electrode with a wall of the passageway.

3. The combination of claim 2 in which the compressible elastic tubular electrode has spaced edges.

4. The combination of claim 2 in which the compressible elastic tubular electrode has lapped edges.

References Cited

UNITED STATES PATENTS

| 2,083,309 | 6/1937 | Applegate | 219—76 X |
| 2,151,914 | 3/1939 | Hopkins | 219—76 X |
| 3,051,822 | 8/1962 | Bernard et al. | 219—146 X |
| 3,184,578 | 5/1965 | Albers et al. | 219—146 |

JOSEPH V. TRUHE, Primary Examiner

C. L. ALBRITTON, Assistant Examiner

U.S. Cl. X.R.

219—145, 146